US011450317B2

(12) United States Patent
Tang et al.

(10) Patent No.: US 11,450,317 B2
(45) Date of Patent: Sep. 20, 2022

(54) SMART FURNITURE CONTROLLER WITH VOICE RECOGNITION (71) Applicant: eMoMo Technology Co., Ltd., Baoan (CN)

(72) Inventors: Wenji Tang, Shenzhen (CN); Jingzhi Chen, Shenzhen (CN); Zhigang Wang, Qiyang (CN); Wei Zhou, Wuhan (CN); Ming Kong, Gaotieling Town (CN); Lin Chen, Suizhou (CN); Shunde Yang, Zhuxi (CN); Jiandong Li, Huazhou (CN); Qishuang Lu, Dengzhou (CN); Zaigui Yang, Xiushan (CN)

(73) Assignee: eMoMo Technology Co., Ltd., Baoan (CN)

( * ) Notice: Subject to any disclaimer, the term of this patent is extended or adjusted under 35 U.S.C. 154(b) by 148 days.

(21) Appl. No.: 16/586,265

(22) Filed: Sep. 27, 2019

(65) Prior Publication Data
US 2020/0168219 A1 May 28, 2020

(30) Foreign Application Priority Data
Nov. 23, 2018 (CN) .......................... 201811410254.5

(51) Int. Cl.
G10L 15/22 (2006.01)
G10L 17/00 (2013.01)
A47C 21/00 (2006.01)
(Continued)

(52) U.S. Cl.
CPC ............ *G10L 15/22* (2013.01); *A47C 21/003* (2013.01); *A47C 21/006* (2013.01);
(Continued)

(58) Field of Classification Search
CPC ..................... G10L 15/22; G10L 17/22; G10L 2015/223; A61G 15/02
(Continued)

(56) References Cited

U.S. PATENT DOCUMENTS

D392,976 S    3/1998  Fenner et al.
D488,147 S    4/2004  Solland
(Continued)

FOREIGN PATENT DOCUMENTS

CN    109431130 A    3/2019

OTHER PUBLICATIONS

United States Patent and Trademark Office; Non-Final Office Action for U.S. Appl. No. 16/812,178; dated Apr. 21, 2022; 20 pages.

*Primary Examiner* — George C Monikang
(74) *Attorney, Agent, or Firm* — Moyles IP, LLC (57) ABSTRACT The disclosure relates to a smart furniture controller with voice recognition, including a controller body and a control circuit. The control circuit is disposed in the controller body. The control circuit comprises a main control unit, a voice recognition module, an operation panel, a control output interface and a power module. The voice recognition module is connected to the main control unit; a microphone and a loudspeaker are connected to the voice recognition module; the operation panel is connected to the main control unit, and the control output interface is connected to the main control unit. The disclosed embodiments integrate a voice recognition module in the controller. Voice commands can be recognized through the voice recognition module, allowing to control the smart furniture via voice, and making the operation simpler and more convenient.

20 Claims, 9 Drawing Sheets (51) Int. Cl.
*A47C 21/04* (2006.01)
*G05B 15/02* (2006.01)
*H04R 1/02* (2006.01)
*H04R 1/04* (2006.01)
*A47B 97/00* (2006.01)
*H02J 7/00* (2006.01)

(52) U.S. Cl.
CPC ............ *A47C 21/048* (2013.01); *G05B 15/02* (2013.01); *H04R 1/025* (2013.01); *H04R 1/04* (2013.01); *A47B 97/00* (2013.01); *A47B 2220/0077* (2013.01); *A47B 2220/0091* (2013.01); *G10L 2015/223* (2013.01); *H02J 7/00* (2013.01)

(58) Field of Classification Search
USPC .................................................. 704/231, 246
See application file for complete search history.

(56) References Cited

U.S. PATENT DOCUMENTS

| | | | |
|---|---|---|---|
| 6,724,102 B1 | 4/2004 | Kelwaski et al. | |
| D522,492 S | 6/2006 | Carbone | |
| D525,615 S | 7/2006 | Tanaka et al. | |
| D562,307 S | 2/2008 | Warden | |
| D596,157 S | 7/2009 | Warden et al. | |
| D681,007 S | 4/2013 | Ryu et al. | |
| D776,638 S | 1/2017 | Pietschmann et al. | |
| D788,718 S | 6/2017 | Tang et al. | |
| D813,179 S | 3/2018 | Wu et al. | |
| D813,838 S | 3/2018 | Pietschmann et al. | |
| D841,614 S | 2/2019 | Krapfl et al. | |
| D841,623 S | 2/2019 | Nugent et al. | |
| D857,647 S | 8/2019 | Pietschmann et al. | |
| D884,672 S | 5/2020 | Nugent et al. | |
| D884,685 S | 5/2020 | Chen | |
| D886,771 S | 6/2020 | Naddei | |
| D887,389 S | 6/2020 | Zhang | |
| D888,020 S | 6/2020 | Lyu et al. | |
| D890,730 S | 7/2020 | Lu | |
| D890,731 S | 7/2020 | Lu et al. | |
| D895,566 S | 9/2020 | Laube et al. | |
| D895,583 S | 9/2020 | Smith et al. | |
| D896,779 S | 9/2020 | Lin | |
| 2014/0306505 A1 | 10/2014 | Koch | |
| 2019/0216228 A1* | 7/2019 | Bertinato | A47C 31/008 |
| 2022/0078555 A1 | 3/2022 | Nelson et al. | |

* cited by examiner

SMART FURNITURE CONTROLLER WITH VOICE RECOGNITION

CROSS-REFERENCE TO RELATED APPLICATIONS

This application claims priority to CN Patent Application No. 201811410254.5 filed Nov. 23, 2018, the entire contents of which are incorporated herein by reference.

BACKGROUND OF THE DISCLOSURE

The disclosure relates to a furniture controller, in particular a smart furniture controller with voice recognition, belonging, for example and without limitation, to the technical field of smart furniture.

With the improvement of people's living standards, people's requirements for quality of life are getting higher and higher. Traditional furniture can no longer meet people's requirements in daily life, giving way to more and more intelligent furniture in everyday life. Take a smart sofa as example, when the seat back rises and falls, the position of the person on the cushion also changes. For example, when the seat back is lowered, the person will move his/her hip backwards and vice versa. The rise and fall of the sofa can be controlled by the up and down buttons. The electric recliners can adjust the seat cushion following the movement of the back part. In order to make the sofa more comfortable, when the seatback rises, two headrests rise on the waist and head parts, giving support to the user's head and waist; when the back is lowered to the flat position, the person can lie down and rest, and the seatback is horizontally flat with a headrest only at the head part. There are more sophisticated models as the double electric power sofas and triple electric power sofas. When sitting, the seat back is up, and there is no need for a footstool in front. The feet can easily be placed on the floor or in a footbath. When the footstool is needed, it can smoothly come out. However, the footstool has an oblique design with a slightly low bearing capacity, making this kind of structure more complicated but at the same time more reliable and sophisticated. Quadruple and quintuple electric power sofas are designed based on the triple electric power sofa, adding a waist device at the seat back and lifting armrests. The electric massage system is equipped with massagers at the neck, back, waist and buttocks including vibrating, rolling, airbag and robotic massagers. Electric heating and cooling are realized by adding coolers, such as Peltier Thermoelectric Coolers ("PCT coolers"), and heaters, such as Positive Temperature Coefficient heaters ("PCT heaters") into the seat cushion and seat back so as to provide more comfortable experience.

In addition to the smart sofa, there are smart beds and other smart furniture. For the currently used smart furniture controllers, the control buttons are embedded in the furniture. When using it, people have to press these buttons to operate the furniture, which is not convenient enough.

In view of the above deficiencies for smart furniture control and operation, such as inconvenient control and operation, a need exists for more convenient control devices, systems, and methods for smart furniture control.

BRIEF DESCRIPTION OF THE EXEMPLARY EMBODIMENTS

In an aspect, the exemplary embodiments include a smart furniture controller with voice recognition, comprising: a microphone; and, a control circuit disposed in a controller main body, wherein the control circuit comprises a main control unit, a voice recognition module, an operation panel, and a control output interface, the voice recognition module is connected to the main control unit, the microphone is connected to the voice recognition module, the operation panel is connected to the main control unit, and the control output interface is connected to the main control unit, and the microphone and the control circuit are together configured to receive a voice command from a user and control a function of a smart furniture item in response to the voice command.

In an aspect, the exemplary embodiments include a smart furniture controller with voice recognition for controlling one or more functions of a furniture item, comprising: a controller main body defining a main body interior; an interface; a microphone; and, a control circuit positioned within the main body interior, the control circuit including at least a main control unit, a voice recognition module, and a control output interface, wherein the microphone is configured for receiving a voice command from a user and relaying the voice command to the voice recognition module, the voice recognition module is configured for receiving the voice command, generating a digital signal based on the voice command, and relaying the digital signal to the main control unit, the main control unit is configured for receiving the digital signal and relaying a corresponding control signal to the control output interface, and the control output interface is configured for receiving the control signal and actuating the function of the furniture item associated with the control signal.

In an aspect, the exemplary embodiments include a method for controlling a function of a furniture item using a smart furniture controller with voice recognition, comprising: receiving at a microphone a voice command from a user, wherein the smart furniture controller includes a main body defining a main body interior, and the microphone is disposed within the main body interior, wherein the main body includes an interface for channeling the voice command to the microphone; relaying the voice command from the microphone to a voice recognition module electrically connected to the microphone; generating with the voice recognition module a digital signal based on the voice command; relaying the digital signal from the voice recognition module to a main control unit electrically connected to the voice recognition module; generating with the main control unit a control signal based on the digital signal; relaying the control signal from the main control unit to a control output interface electrically connected to the main control unit; and, initiating the function of the furniture item via a corresponding function interface of the control output interface.

BRIEF DESCRIPTION OF THE DRAWINGS

A more particular description will be rendered by reference to exemplary embodiments that are illustrated in the accompanying figures. Understanding that these drawings depict exemplary embodiments and do not limit the scope of this disclosure, the exemplary embodiments will be described and explained with additional specificity and detail through the use of the accompanying drawings in which.

Various features, aspects, and advantages of the exemplary embodiments will become more apparent from the following detailed description, along with the accompanying drawings in which like numerals represent like components throughout the figures and detailed description. The various described features are not necessarily drawn to scale in the drawings but are drawn to emphasize specific features relevant to some embodiments.

The headings used herein are for organizational purposes only and are not meant to limit the scope of the disclosure or the claims. To facilitate understanding, reference numerals have been used, where possible, to designate like elements common to the figures.

DETAILED DESCRIPTION

This disclosure provides exemplary embodiments of a smart furniture controller with voice recognition, which integrates a voice recognition module in the controller. With the voice recognition module, the voice sound and associated commands may be recognized, making possible for the smart furniture to be controlled by voice.

An exemplary embodiment of this disclosure is a smart furniture controller with voice recognition and including a controller body and a control circuit. The control circuit is disposed in the controller body. The control circuit includes a main control unit, a voice recognition module, an operation panel, a control output interface and a power module. The voice recognition module is connected to the main control unit; a microphone is connected to the voice recognition module; the operation panel is connected to the main control unit, and the control output interface is connected to the main control unit.

In other aspects, the exemplary embodiments of a smart furniture controller may include: a loudspeaker connected to the voice recognition module, a control box in which the control output interface is disposed, and an auxiliary control unit disposed in the control box, wherein the auxiliary control unit and the main control unit are connected, and the control output interface and the auxiliary control unit are connected. In the exemplary embodiments, the control output interface may include, among other things, an actuator control interface, a heating pad control interface, a light control interface, a massage motor interface, a kneading interface, and the like as described herein and/or known functions of smart and/or functional furniture.

In a further aspect, the controller may include a power module, which adopts a voltage converter. A security fuse is connected in series with the input end of the voltage converter, and a Transient-Voltage-Suppression (TVS) diode is connected to the front end of the security fuse.

In still a further aspect, a main body of the controller body includes a front outer casing, a rear outer casing, a circuit board and buttons. The front outer casing and the rear outer casing are installed together in an opposite direction to form an outer casing. The circuit board is disposed inside the outer casing and the buttons correspond to the position and architecture of the circuit board.

In the exemplary controller body, the front outer casing is covered with a mask, which is equipped with an interface. The control output interface is disposed at a position of the circuit board corresponding to the interface in the mask.

Reference will now be made in detail to various embodiments. Each example is provided by way of explanation and is not meant as a limitation and does not constitute a definition of all possible embodiments.

For purposes of this disclosure, "connected" means in electrical contact or communication, except where the disclosure makes clear that "connected" refers to a purely physical connection. Electrical contact or communication includes, for example and without limitation, one or more physical connections between conductive components, either directly or through intermediate conductive components or relays, and wireless communication such as by Bluetooth transmission or the like, and/or as described for particular aspects of this disclosure. Electrical contact or communication may provide, for example and without limitation, a path for transmission of electrical power, digital signals, one-way or two-way communication via radio waves, and the like.

Where the disclosure makes clear that "connected" refers to a purely physical connection or joining, "connected", for purposes of this disclosure, means integrally formed, or securely, separably, or removably joined by known techniques consistent with the disclosure.

For purposes of this disclosure, relative terms including, without limitation, "top", "bottom", "above", "below", "within", etc. are used to aid the description of, e.g., configurations of features as shown in the accompanying figures, and otherwise as the disclosure makes clear. Such relative terms do not imply any particular dimension or delineation of or between features except where the disclosure makes clear.

Embodiments described herein relate generally to devices, systems, and methods for smart furniture control including voice recognition. For purposes of this disclosure, the phrases "devices," "systems," and "methods" may be used either individually or in any combination referring without limitation to disclosed components, grouping, arrangements, steps, functions, or processes.

For purposes of illustrating features of the embodiments, an exemplary embodiment will now be introduced and referenced throughout the disclosure. It will be understood that this example and other exemplary embodiments described in this disclosure are illustrative and not limiting and are provided purely for explanatory purposes.

Figure 1:
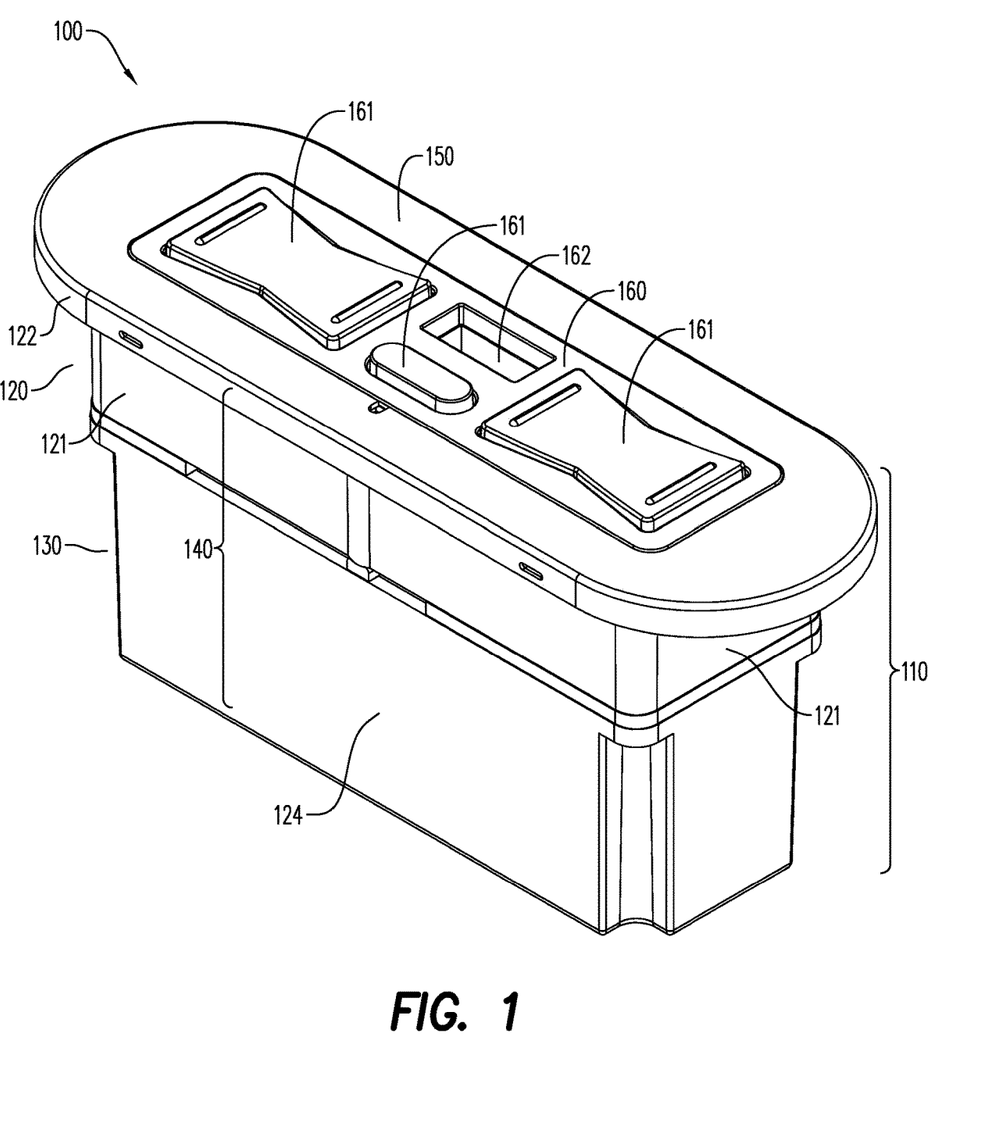
FIG. 1 is a perspective view of a three-dimensional structure of a smart furniture controller with voice recognition, according to an embodiment.
Figure 2:
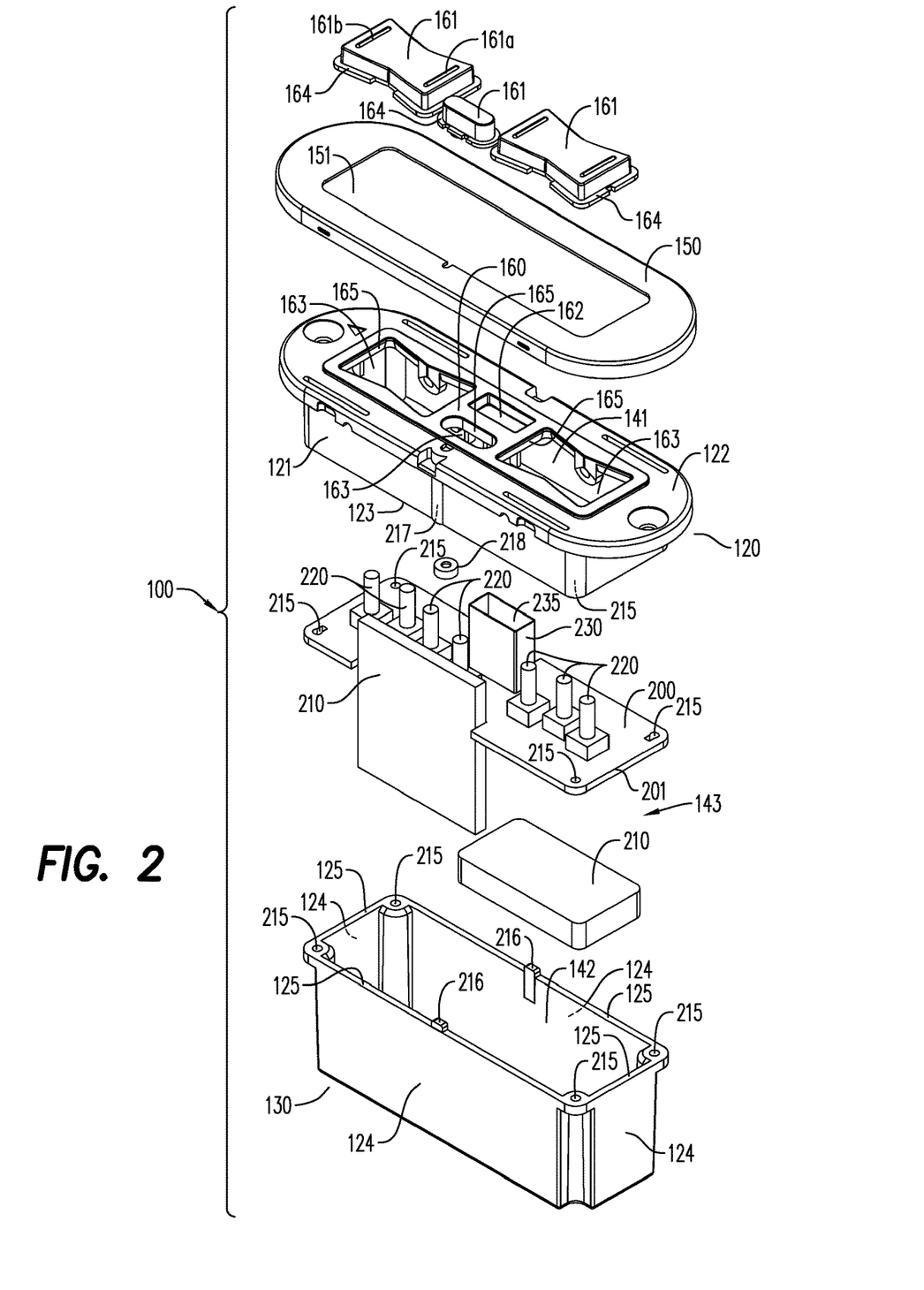
FIG. 2 is a decomposition diagram of smart furniture controller with voice recognition, according to an embodiment.

With reference to FIGS. 1 and 2, an exemplary smart furniture controller 100 includes, among other things, a main body 110 incorporating a front casing (or, "front outer casing") 120 connected to a top of a back casing (or, "rear outer casing") 130. The front casing 120 has a skirt 121 extending downwardly from an upper plate 122 of the front casing 120. The skirt 121 is dimensioned such that a bottom surface 123 of the skirt 121 substantially abuts respective top surfaces 125 of complementarily-configured back casing sidewalls 124 when the front casing 120 and the back casing 130 are joined. The connected front casing 120 and back casing 130 together define an outer casing 140 of the main body 110.

The main body 110 further includes a mask 150 affixed to the top of the upper plate 122 of the front casing 120. The mask 150 may be attached to the upper plate 122 by any known technique for joining components consistent with this disclosure, including, without limitation, snap fits, tongue-in-groove structures, adhesives, clips, and the like. The mask 150 circumscribes an operation array 160 portion of the upper plate 122 of the front casing 120 and the operation array 160 is exposed through an open central portion 151 (FIG. 2) through the mask 150. The operation array 160 contains a plurality of interface buttons 161 exposed therethrough, as further shown and described with respect specifically to FIG. 2. The plurality of interface buttons 161 may control, without limitation, power to various functions of the furniture item, control of various functions of the furniture item, volume of a loudspeaker (as described below) of the furniture item, and the like, and may be shaped and arranged in any configuration according to desired designs for one or more operation interfaces. The operation array 160 further includes an interface 162 therethrough as shown and described with respect to FIG. 2.

With reference now in particular to FIG. 2, the skirt 121 and the upper plate 122 of the front casing 120 define a front hollow interior area 141. Each of the interface buttons 161 is received in a port 163 extending through the operation array 160 (i.e., the upper plate 122 of the front casing 120) between the front hollow interior area 141 and an outside of the main body 110, via the open central portion 151 of the mask 150. The interface buttons 161 may be retained in the ports 163 by, for example, engaging protrusions 164 on the interface buttons 161 with grooves 165 in a corresponding port 163. The grooves 165 may receive and frictionally secure the protrusions 164 to prevent disengagement of the interface buttons 161. Alternatively, or in addition thereto, the interface buttons 161 may be retained within the ports 163 by known techniques such as, without limitation, positioning structures, compressive engagements, resilient supports, clips, straps, adhesives, and the like.

The interface 162 may be, in the exemplary embodiment shown in FIGS. 1 and 2, an opening positioned on, and extending through, the operation array 160 between the front hollow interior area 141 and the outside of the main body 110, via the open central portion 151 of the mask 150. The interface 162 is further described, below, with respect to its interaction with the circuitry of the smart furniture controller 100.

The back casing sidewalls 124 together define a back hollow interior area 142, and together the front hollow interior area 141 and the back hollow interior area 142 define a main body interior 143 when the front casing 120 and the back casing 130 are joined. As shown in the exemplary embodiment of FIG. 2, the back casing sidewalls 124 may be integrally formed, effectively as a single back casing sidewall 124. The disclosure is not limited to any number, configuration, or formation of the back casing sidewall(s) 124. In the assembled smart furniture controller 100, such as shown in FIG. 1, a circuit board 200 containing the control circuitry (discussed below) for the smart furniture controller 100 is received within the main body interior 143. Positioning blocks 210 are also received within the main body interior 143 and are configured for stabilizing and maintaining a position of the circuit board 200 in the main body interior 143. In addition, as shown in the exemplary embodiment of FIG. 2, the circuit board 200 is dimensioned such that a peripheral portion 201 of the circuit board 200 is sandwiched between the skirt 121 and the back casing sidewalls 124 when the front casing 120 and the back casing 130 are joined and the circuit board 200 is thereby secured in position within the main body interior 143.

In an aspect, each of the front casing 120, the back casing 130, and the circuit board 200 includes at least one connector receptacle 215 formed therein and configured for receiving a connecting structure such as a screw, dowel, rod, pin, bolt, clip, and the like for connecting any combination of the front casing 120, the back casing 130, and the circuit board 200 such that the smart furniture controller 100 may be fully and securely assembled. In the exemplary embodiment shown in FIG. 2, the complimentary dimensioning between the front casing 120, the back casing 130, and the circuit board 200 includes substantial alignment of the connector receptacles 215 through each of those components.

In a further aspect for securely assembling the smart furniture controller, connection teeth 216 extend upwardly from the top surfaces 125 of the back casing sidewalls 124 at positions where the circuit board 200, due to its shape, will not lie between the top surfaces 125 of the back casing sidewalls 124 and the bottom surface 123 of the skirt 121 when the front casing 120 and the back casing 130 are joined. The bottom surface 123 of the skirt 121 includes connection notches 217 dimensioned complimentarily to the connection teeth 216 and configured for receiving and retaining the connection teeth 216 therein. The connection notches 217 may retain the connection teeth 216 via frictional engagement, internal clips, or other known techniques.

Accordingly, in the exemplary smart furniture controller 100, the main body 110 includes, among other things, the front casing 120, the back casing 130, the circuit board 200, and the interface buttons 161. The front casing 120 and the back casing 130 are installed together in an opposite direction, forming the outer casing 140 of the exemplary embodiment. The circuit board 200 is set inside the outer casing 140. The interface buttons 161 are set in correspondence with the circuit board 200. In the exemplary embodiments, the front casing 120 is covered with the mask 150, and the main body 110 is equipped with the interface 162. The interface circuit, described below with respect to FIGS. 3 and 4, is disposed at the corresponding position of the circuit board 200.

With continuing reference to FIG. 2, the circuit board 200 includes, among other things, a plurality of operation buttons 220 and an interface conduit 230 positioned on the circuit board 200 such that when the circuit board 200 is positioned within the main body interior 143, one or more of the operation buttons 220 aligns with a corresponding interface button 161 and the interface conduit 230 aligns with the interface 162. In an aspect, the interface buttons 161 are positioned and dimensioned such that, when pushed, each interface button 161 (including each portion of an interface button 161—such as a first function portion 161a and a second function portion 161b—for separately controlling, e.g., volume up and volume down aspects) contacts a corresponding operation button 220 for transmitting to or initiating at a corresponding portion of a control circuit (FIGS. 3-5) a signal corresponding to the pushed button command, as described below with respect to FIGS. 3-5. The operation buttons 220 may therefore include, for example and without limitation, resilient mechanical aspects, as are known, for responsively making an electrical contact with the corresponding portions of the control circuit, and thereby generating the control signal, upon a user pushing the interface buttons 161. In an aspect, the assembly 100 may include one or more bushings 218 positioned for one or more of stabilizing the circuit board 200 against the front casing 120, bridging a gap between an operation button 220 and an interface button 161, insulating one or more portions of the circuit board 200, and the like. As described below, the control signal corresponding to the pushed button command may actuate a function or control of the smart furniture item.

The interface conduit 230 is positioned substantially between the interface 162 and the interface circuit, described below with respect to FIGS. 3 and 4, at the corresponding position of the circuit board 200. The interface conduit 230 defines an interface channel 235 extending therethrough. In an exemplary aspect, the interface 162 is configured for funneling sounds, such as voice commands from a user, into the channel 235, which directs the voice commands to a microphone 305 and a voice recognition module 320 (FIG. 3) as part of the exemplary voice recognition aspect of the smart furniture controller 100, as described below. However, in some embodiments, one or more interfaces may exist, alternatively or in addition, and without limitation, for providing an auxiliary connection such as a Universal Serial Bus (USB) or other auxiliary connection to the smart furniture controller 100 for connecting an auxiliary device such as a digital music player or smart device such as a smartphone, tablet, and the like.

Figure 3:
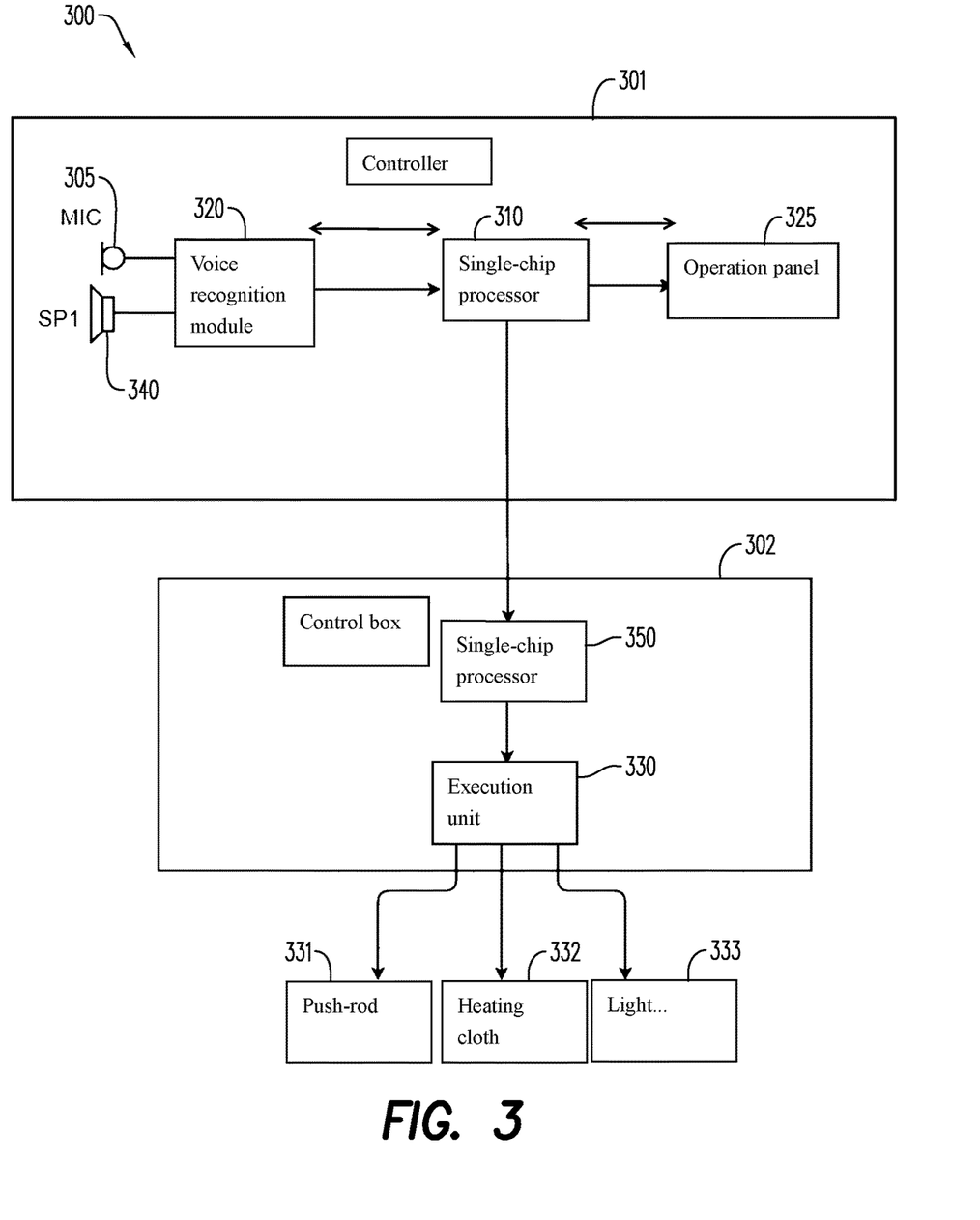
FIG. 3 is a circuit block diagram according to an embodiment.
Figure 4:
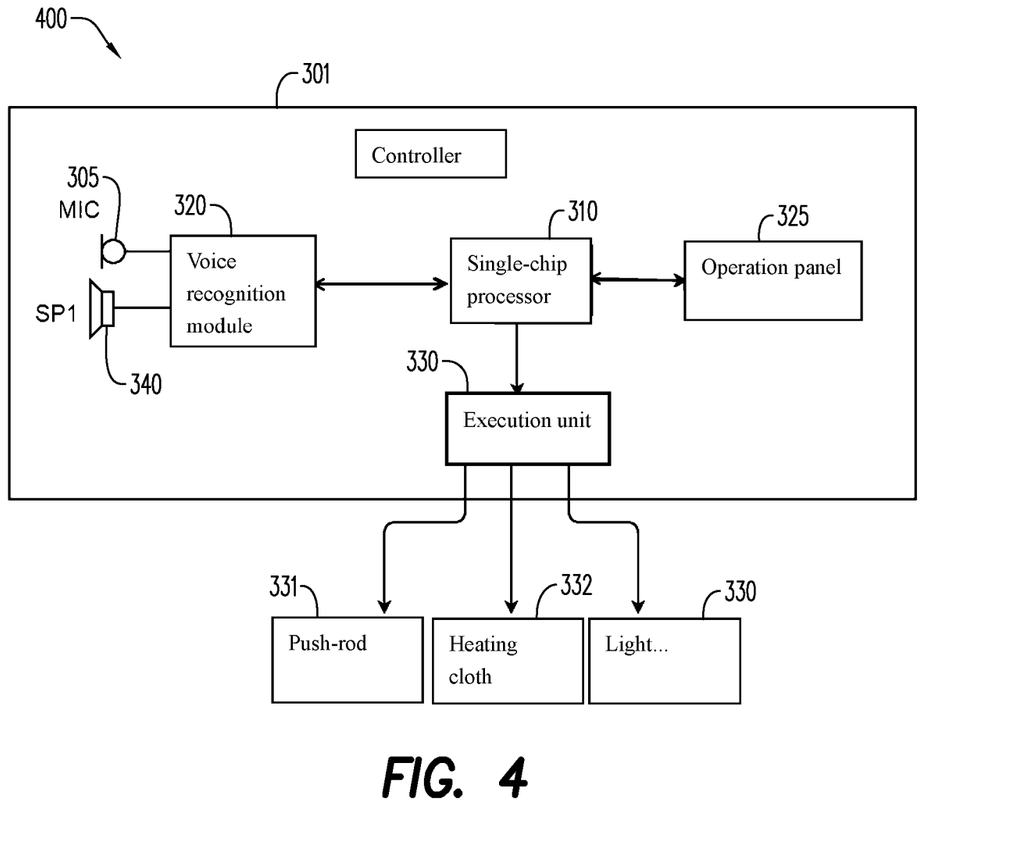
FIG. 4 is a circuit block diagram according to an embodiment.
Figure 11:
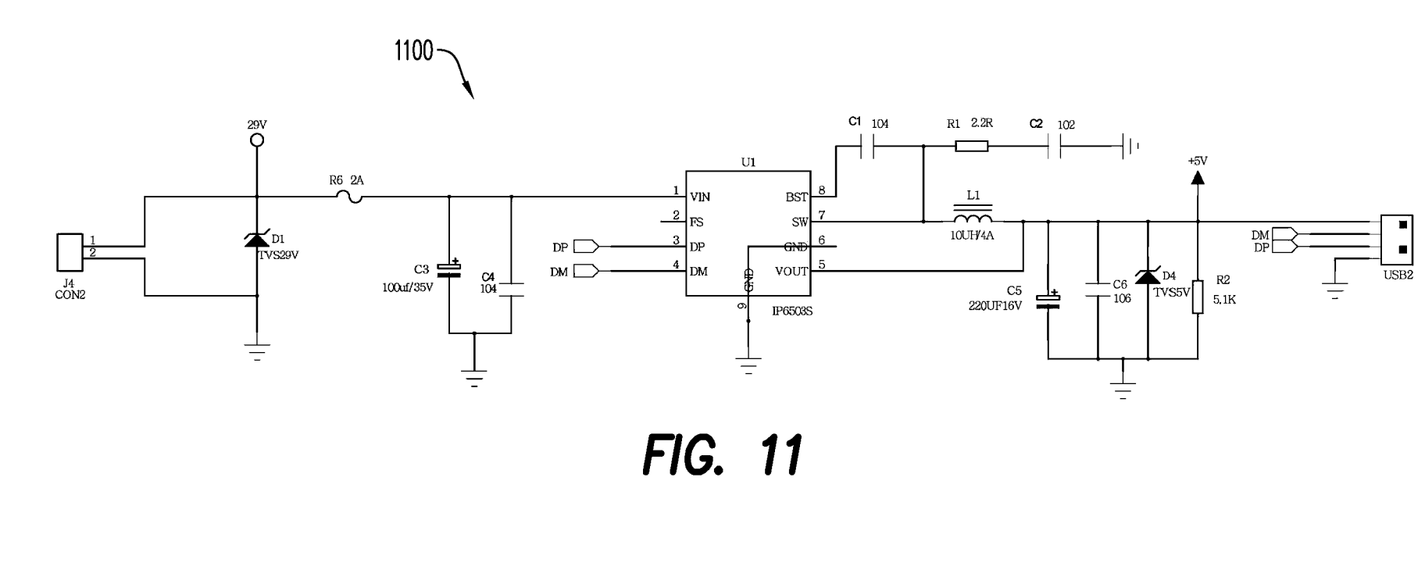

With reference now to FIGS. 3 and 4, the exemplary smart furniture controller 100 includes a main body 110 and a control circuit 300, as previously discussed. The control circuit 300 is disposed in the main body 110, i.e., on the circuit board 200 within the main body interior 143. The exemplary control circuit 300 comprises a main control unit 310, a voice recognition module 320, an operation panel 325, a control output interface 330 ("Execution unit"), and a power module (FIG. 11). The voice recognition module 320 is connected to the main control unit 310; a microphone 305 is connected to the voice recognition module 320; the operation panel 325 is connected to the main control unit 310, and the control output interface 330 is connected to the main control unit 310. The power module is used to supply power.

The interface circuit, as discussed above, may be generally considered as including at least the microphone 305, the voice recognition module 320, and the main control unit 310 for receiving and processing voice or auxiliary signals. Every component of the interface circuit need not be located in the same area of the control circuit 300 on the circuit board 200—i.e., in correspondence with the interface 162. The corresponding position of the interface circuit to the interface 162 may refer only to a configuration in which, in an aspect, the microphone 305, the voice recognition module 320, and the main control unit 310 respectively receive the voice command and process and relay a signal based on the voice command. In various exemplary aspects, the main control unit 310 is responsible for coordinating the various command signals of the control circuit 300 for controlling functions of the smart furniture item. The main control unit 310 is in two-way communication with the voice recognition module 320 and the operation panel 325. As described below, the voice recognition module 320 is configured for recognizing a user's voice commands and transmitting a corresponding control signal to the main control unit 310. The operation panel 325 is configured for detecting, e.g., commands from interface buttons 161, via operation buttons 220, and transmitting corresponding control signals to the main control unit 310. In this embodiment, and with reference back to FIGS. 1 and 2, the operation buttons 220 are disposed on the operation panel 325, and the operation buttons 220 are thereby connected to the main control unit 310.

In an aspect, the main control unit 310 may send to one or both of the voice recognition module 320 and the operation panel 325 confirmation signals, programming updates, calibration commands, or other signals consistent with this disclosure.

Figure 5:
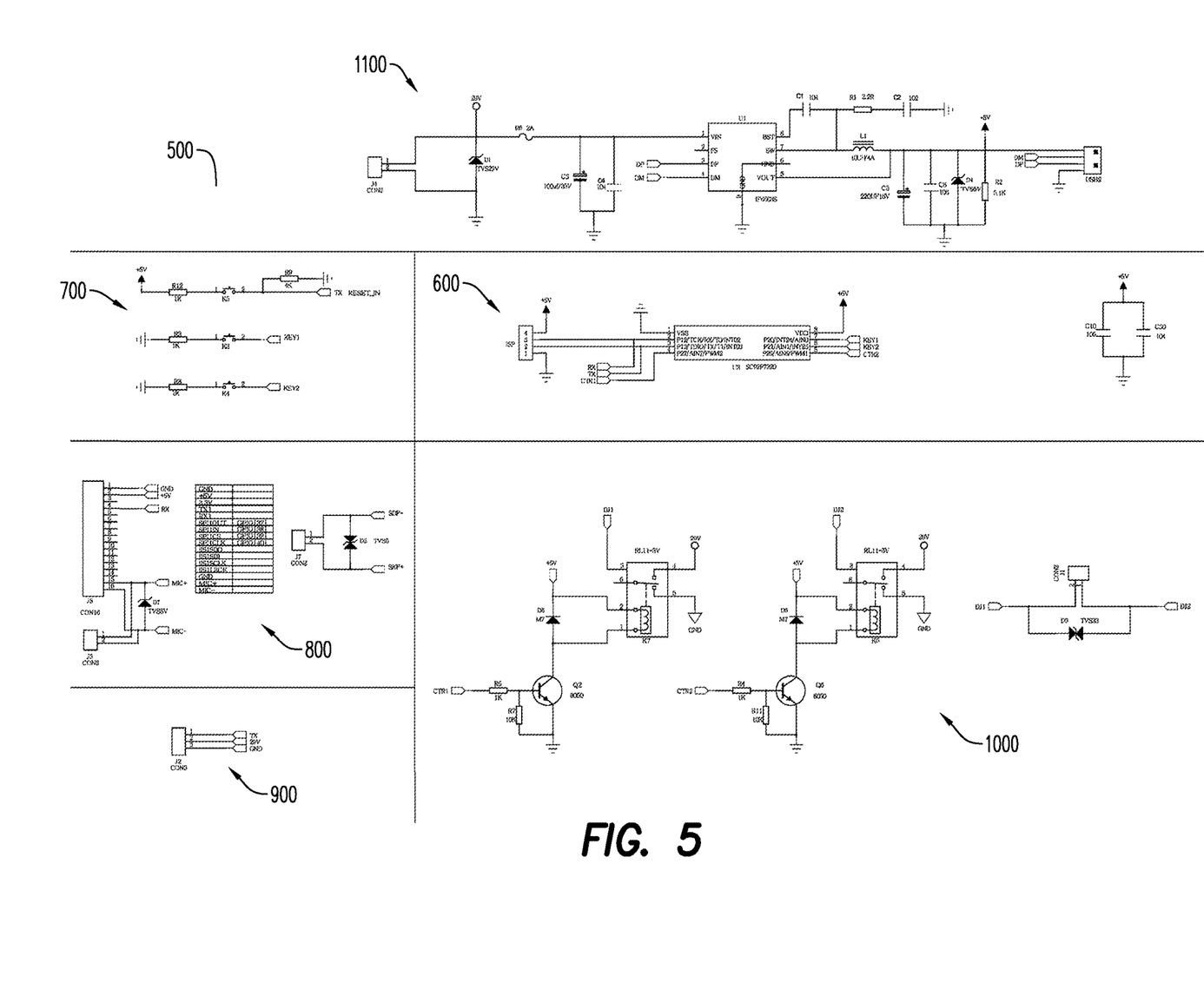
FIG. 5 is a circuit schematic diagram according to an embodiment.
Figure 6:
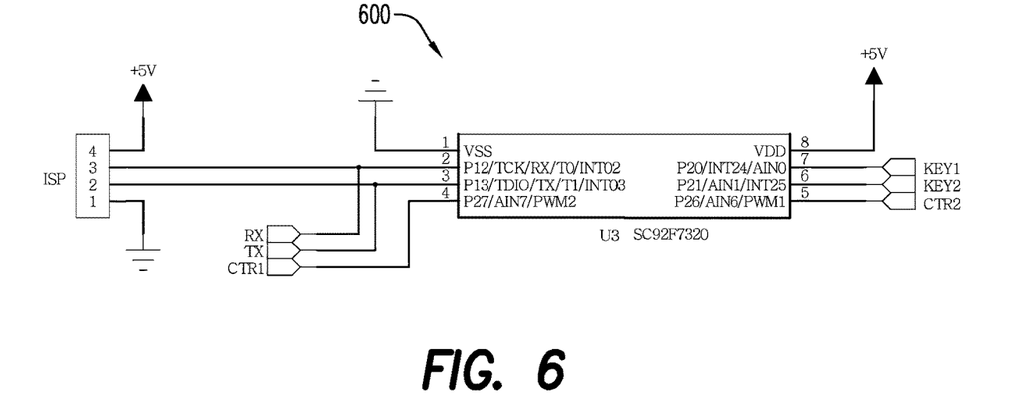
FIG. 6 is a circuit schematic diagram of a main control unit according to an embodiment.
Figure 7:
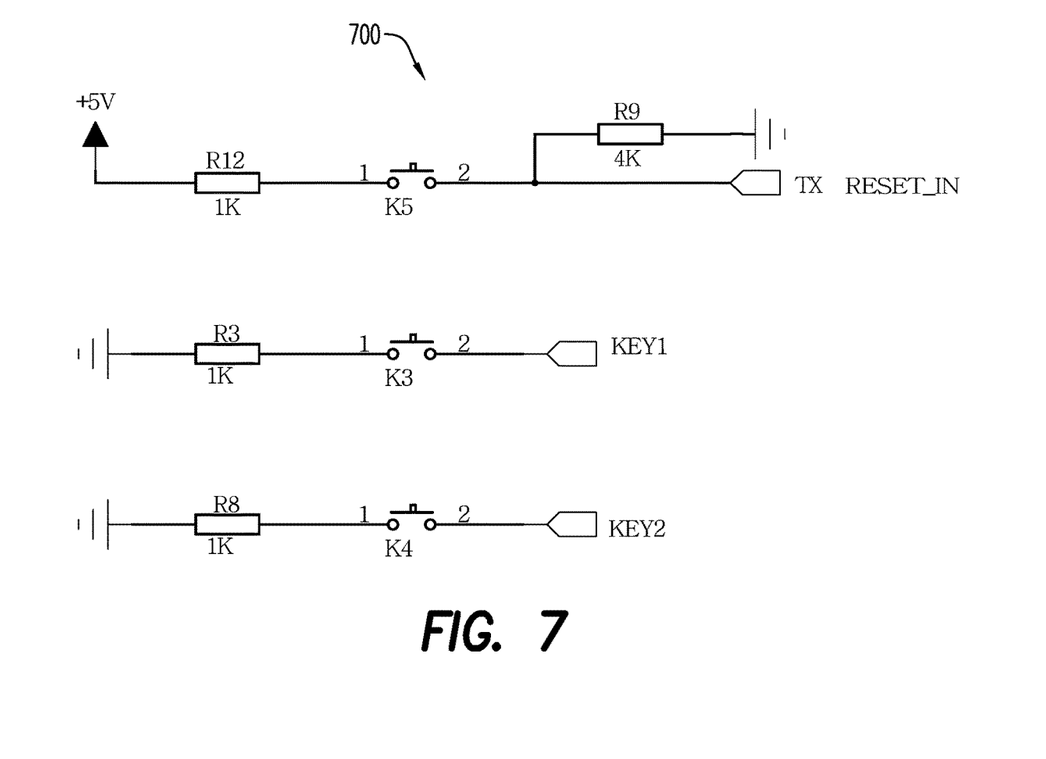
FIG. 7 is a circuit schematic of a button module according to an embodiment.

In the exemplary embodiment shown in FIGS. 3 and 4, and with further reference to FIG. 6, the main control unit 310 may adopt a single-chip processor such as model SC92F7320. Other types of single-chip processors can also be selected according to actual needs. Each and every individual component and connection of the circuit 600 shown in FIG. 6 and other circuit schematic diagrams (FIGS. 5, 7-11) shown in the figures and referenced throughout this disclosure is not necessarily described but would be readily understood by a person having ordinary skill with the standard circuit/electrical wiring symbols and representations as illustrated in the schematics, in view of the disclosure.

Figure 8:
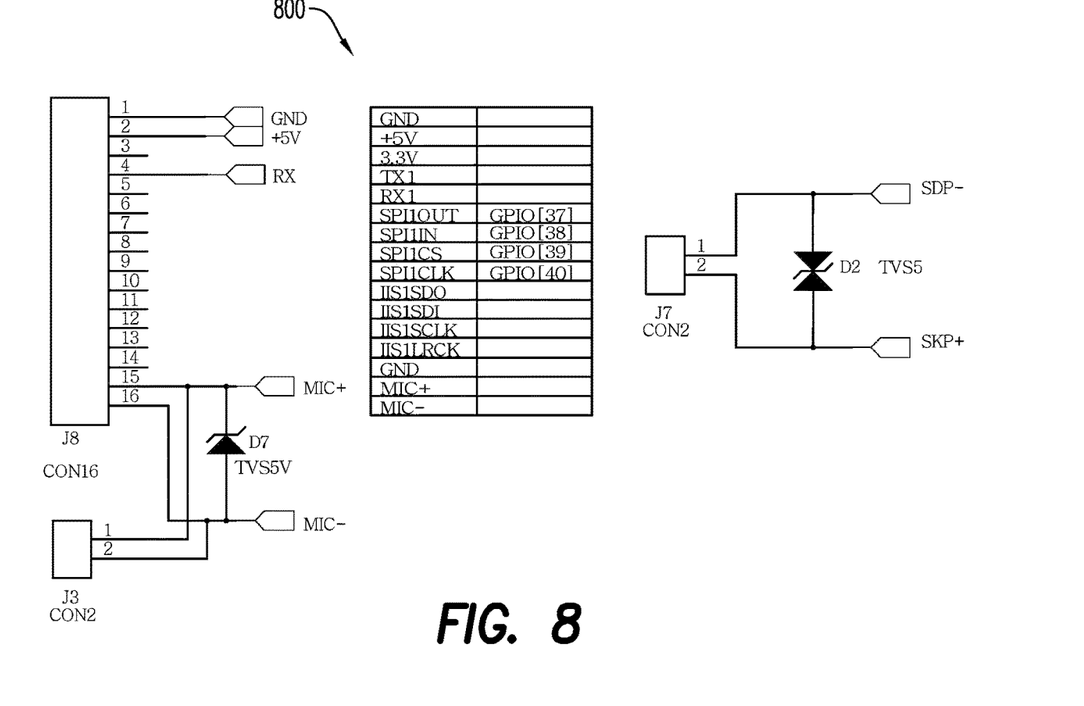
FIG. 8 is a circuit schematic diagram of a voice recognition interface according to an embodiment.
Figure 9:
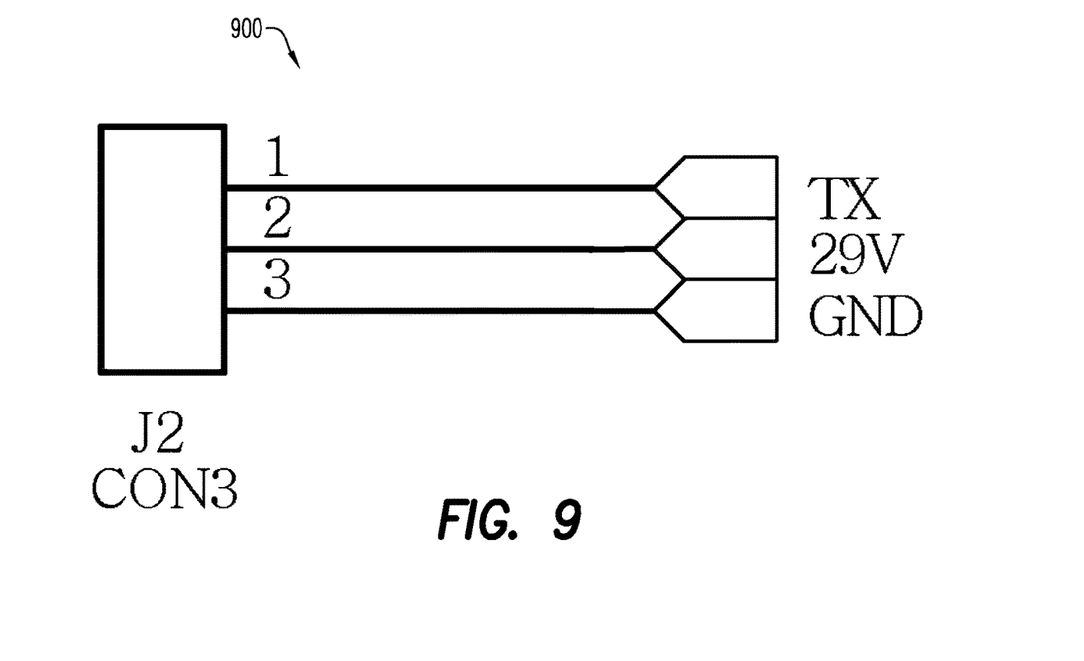
FIG. 9 is a circuit schematic diagram of a communication interface of a client processor according to an embodiment.
Figure 10:
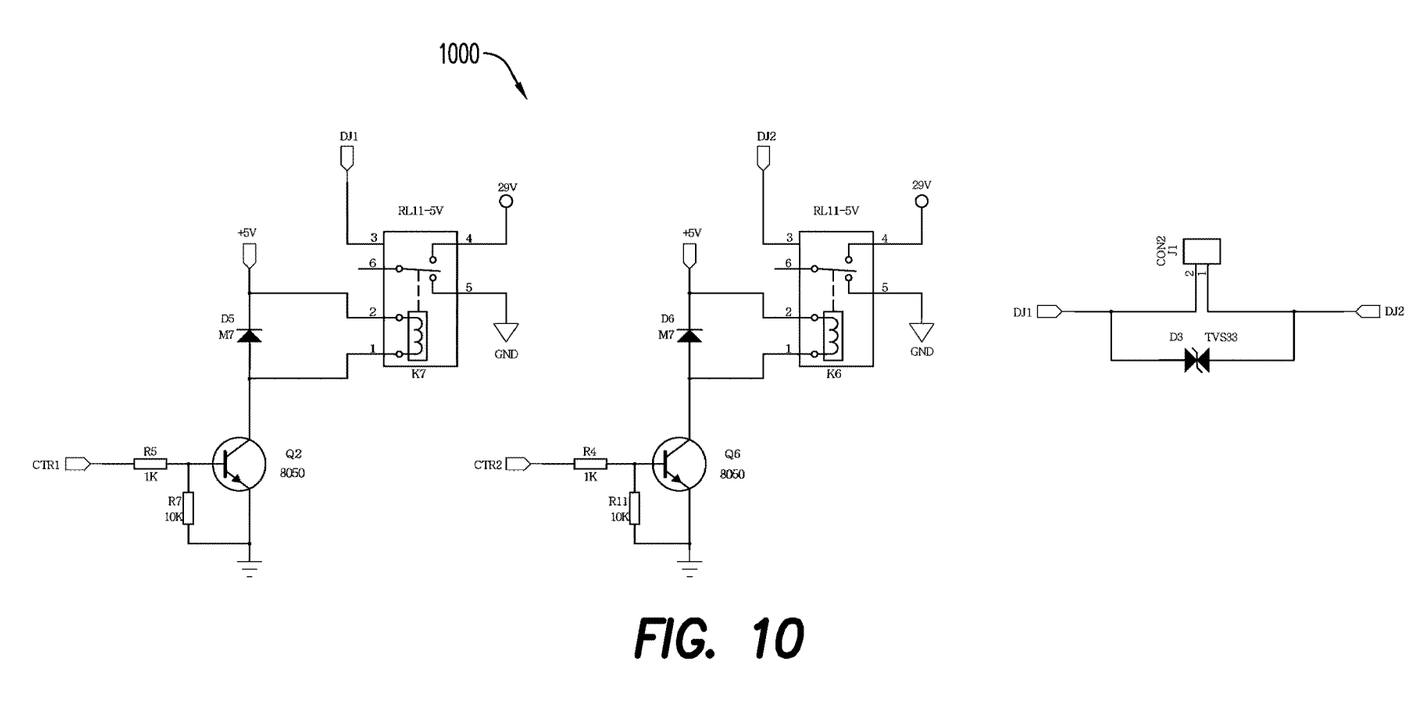
FIG. 10 is a circuit schematic diagram of a motor drive module according to an embodiment; and, FIG. 11 is a circuit schematic diagram of a power module according to an embodiment.

With continuing reference to FIGS. 3 and 4, and further reference to the voice recognition module circuit schematic 800 shown in FIG. 8, a TVS diode is connected to a microphone circuit (i.e., between MIC+ and MIC−) on the voice recognition module 320. A loudspeaker SP1 340 is connected to the voice recognition module 320 to output and broadcast the information recognized by the voice recognition module 320. A TVS diode is connected to the speaker circuit (i.e., between SKP+ and SKP−) on the voice recognition module 320. An exemplary intelligent voice chip that may be adopted includes model CI1006. Other types of voice chips can also be used according to actual needs. The TVS diodes connected to the microphone and speaker circuits on the voice recognition module 320 are 5V diodes.

In the exemplary embodiments, the control output interface 330 adopts a motor drive interface 1000 (FIG. 10), which uses a relay. A control coil of the relay is connected in series with a triode, the base of which is connected with the main control unit 310. The triode can be used as a switch. The main control unit 310 controls the triode to turn on or off; the triode controls the relay, and the relay controls a motor connected to the motor drive interface so as to carry out an actuator function 331. In an embodiment, the control output interface 330 also includes a heating pad control interface and a light control interface for respectively controlling a heating pad function 332 and a light control function 333. In various other embodiments, the control output interface 330 may include, without limitation, one or more interfaces for controlling one or more of an actuator (for a furniture or auxiliary component function), a massage function, an audio function such as playing an electronic audio file, a cup holder function such as heating, cooling, and/or lighting a cup holder, a charging function for providing power to an electronic device, a furniture function such as air conditioning, and the like.

In the exemplary embodiments, the power module 1100 (FIG. 11) may adopt the voltage converter U1 including model IP6503S. Because the internal device of the smart furniture uses the +29V power supply, the voltage converter converts the +29V power supply into a +5V power supply, supplying power to other circuit modules. A security fuse R6 is connected in series to the input end of the converter U1, and a TVS diode with a withstand voltage of 32V is connected to the front end of the fuse R6. The power module 1100 can also be powered by an external power source in this embodiment.

With reference now back to FIGS. 3 and 4, a monolithic and a split design are respectively shown according to the actual use conditions:

Embodiment 1

Refer to FIG. 3. In this embodiment, the control circuit 300 has a split design, which is divided into a controller main processor 301 and a control box 302. For purposes of this disclosure, the controller main processor 301 and the control box 302 may respectively be either a portion of the control circuit 300 disposed on the circuit board 200 and including the components of the controller main processor 301/control box 302 as described below, or a physical container for housing the components of the controller main processor 301/control box 302 and disposed, e.g., within the main body interior 143. The main control unit 310, the voice recognition module 320 and the operation panel 325 are disposed in the controller body of the controller main processor 301. The controller main processor 301 may be regarded as the host, and the control output interface 330 is set in the control box 302, which can be regarded as the client. An auxiliary control unit 350 is disposed in the control box 302 and can adopt a single-chip processor (its model can be the same to or different from that of the main control unit 310). The control output interface 330 is connected to the auxiliary control unit 350, which outputs control parameters to the control output interface 330. The main control unit 310 and the auxiliary control unit 350 are connected via a serial interface. The former outputs control signals to the latter, which outputs control parameters to the control output interface 330 so as to control the smart furniture. The auxiliary control unit 350 can store the control parameters for the next adjustment despite that this disclosure contemplates a separate memory function (e.g., by known electronic memory media) in some embodiments of a smart furniture controller.

Embodiment 2

Refer to FIG. 4. In this embodiment, the control circuit 300 has a monolithic design, i.e. all the function modules (the main control unit 310, the voice recognition module 320, the operation panel 325, and the control output interface 330) are integrated in a controller main processor 301.

With reference now to FIG. 5, a mosaic 500 of circuit schematic diagrams illustrating the exemplary electronic components for use with the disclosed embodiments is shown. The mosaic 500 includes the main control unit 600, a button module 700 (FIG. 7), the voice recognition interface 800, a communication interface 900 (FIG. 9) of a client processor (e.g., auxiliary control unit 350), the motor drive module 1000, and the power module 1100.

In actual use, the disclosed embodiments may be installed in sofas, beds or other smart furniture, allowing the user to input control commands by voice or buttons to control the actuators, heaters, lights and other elements of the smart furniture. Accordingly, the exemplary embodiments of a smart furniture controller may allow for recognizing voice commands through the voice recognition module, thereby allowing a user to control the smart furniture directly through voice commands and making the operation simpler and more convenient.

The disclosed embodiments integrate a voice recognition module in the controller. Voice commands can be recognized through the voice recognition module, allowing to control the smart furniture via voice, and making the operation simpler and more convenient.

This disclosure, in various embodiments, configurations and aspects, includes components, methods, processes, systems, and/or apparatuses as depicted and described herein, including various embodiments, sub-combinations, and subsets thereof. This disclosure contemplates, in various embodiments, configurations and aspects, the actual or optional use or inclusion of, e.g., components or processes as may be well-known or understood in the art and consistent with this disclosure though not depicted and/or described herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that the appended claims should cover variations in the ranges except where this disclosure makes clear the use of a particular range in certain embodiments.

The terms "determine", "calculate" and "compute," and variations thereof, as used herein, are used interchangeably and include any type of methodology, process, mathematical operation or technique.

This disclosure is presented for purposes of illustration and description. This disclosure is not limited to the form or forms disclosed herein. In the Detailed Description of this disclosure, for example, various features of some exemplary embodiments are grouped together to representatively describe those and other contemplated embodiments, configurations, and aspects, to the extent that including in this disclosure a description of every potential embodiment, variant, and combination of features is not feasible. Thus, the features of the disclosed embodiments, configurations, and aspects may be combined in alternate embodiments, configurations, and aspects not expressly discussed above. For example, the features recited in the following claims lie in less than all features of a single disclosed embodiment, configuration, or aspect. Thus, the following claims are hereby incorporated into this Detailed Description, with each claim standing on its own as a separate embodiment of this disclosure.

Advances in science and technology may provide variations that are not necessarily express in the terminology of this disclosure although the claims would not necessarily exclude these variations.

What is claimed is:

1. A smart furniture controller with voice recognition, comprising:
    a microphone; and
    a control circuit disposed in a controller main body, wherein
        the control circuit comprises a main control unit, a voice recognition module, an operation panel, and a control output interface,
        the voice recognition module is connected to the main control unit,
        the microphone is connected to the voice recognition module,
        the operation panel is connected to the main control unit, and
        the control output interface is connected to the main control unit, and
    the microphone and the control circuit are together configured to receive a voice command from a user and control a function of a smart furniture item in response to the voice command.

2. The smart furniture controller of claim 1, further comprising a loudspeaker connected to the voice recognition module.

3. The smart furniture controller of claim 2, wherein the control circuit includes a control box, and the control output interface is disposed in the control box.

4. The smart furniture controller of claim 3, further comprising an auxiliary control unit disposed in the control box, wherein the auxiliary control unit and the main control unit are connected, and the control output interface and the auxiliary control unit are connected.

5. The smart furniture controller of claim 1, wherein the control output interface includes at least one of an actuator control, a light control, a heating pad control, a massage control, an audio control, a cup holder control, a charging control, and a furniture control.

6. The smart furniture controller of claim 1, further comprising a power module, wherein the power module adopts a voltage converter, a security fuse is connected in series with an input end of the voltage converter, and a transient voltage suppression (TVS) diode is connected to a front end of the security fuse.

7. The smart furniture controller of claim 1, wherein the controller main body comprises a front casing, a mask secured to a top of the front casing, and a back casing secured to a bottom of the front casing, wherein the front casing and the back casing together form an outer casing and the outer casing defines a main body interior within the outer casing.

8. The smart furniture controller of claim 7, further comprising an operation array disposed within a central open portion of the mask; and
    at least one interface button disposed on the operation array, wherein
        the control circuit is disposed on a circuit board, and the circuit board is disposed within the main body interior,
        the at least one interface button is positioned to actuate a corresponding operation button configured for generating a control signal at the operation panel of the control circuit.

9. The smart furniture controller of claim 7, wherein the operation array includes an interface for channeling the voice command to an interface circuit of the control circuit on the circuit board, wherein the interface circuit includes the microphone, the voice recognition module, and the main control unit.

10. A smart furniture controller with voice recognition for controlling one or more functions of a furniture item, comprising:
    a controller main body defining a main body interior;
    an interface;
    a microphone; and
    a control circuit positioned within the main body interior, the control circuit including at least a main control unit, a voice recognition module, and a control output interface, wherein
        the microphone is configured for receiving a voice command from a user and relaying the voice command to the voice recognition module,
        the voice recognition module is configured for receiving the voice command, generating a digital signal based on the voice command, and relaying the digital signal to the main control unit,
        the main control unit is configured for receiving the digital signal and relaying a corresponding control signal to the control output interface, and
        the control output interface is configured for receiving the control signal and actuating the function of the furniture item associated with the control signal.

11. The smart furniture controller of claim 10, wherein the controller main body includes a front casing and a back casing, wherein the back casing is connected to, and extends away from, the front casing, wherein
    the front casing includes a skirt extending downwardly from an upper plate, wherein the skirt and the upper plate together define a front hollow interior area,
    the back casing includes a back casing sidewall connected to the skirt, wherein the back casing sidewall defines a back hollow interior area,
    the main body interior includes the front hollow interior area and the back hollow interior area, and the control circuit is disposed on a circuit board positioned within the main body interior.

12. The smart furniture controller of claim 11, wherein an interface conduit extends, within the main body interior, between the interface and the control circuit, and the interface conduit is configured for channeling the voice command to the microphone.

13. The smart furniture controller of claim 11, wherein the front casing includes an operation array, wherein the operation array includes one or more interface buttons received in button ports extending through the front casing between the front hollow interior area and an outside of the main body, and each of the one or more interface buttons is positioned to actuate a corresponding operation button electrically connected to the control circuit on the circuit board.

14. The smart furniture controller of claim 13, wherein the control circuit on the circuit board includes an operation panel, wherein each operation button is positioned to activate, when the operation button is actuated, a corresponding portion of the operation panel such that the operation panel generates an operation signal corresponding to the operation button.

15. The smart furniture controller of claim 10, wherein the control circuit includes a controller main processor, wherein the microphone, the main control unit, the voice recognition module, and the control output interface are disposed in the controller main processor, and the main control unit is electrically connected to each of, and between, the voice recognition module and the control output interface.

16. The smart furniture controller of claim 10, wherein the control circuit includes a controller main processor and a control box, wherein the microphone, the main control unit, and the voice recognition module are disposed in the controller main processor and the control output interface and an auxiliary control unit are disposed in the control box, wherein the main control unit is electrically connected to each of, and between, the voice recognition module and the auxiliary control unit, and the control output interface is electrically connected to the auxiliary control unit.

17. A method for controlling a function of a furniture item using a smart furniture controller with voice recognition, comprising:

receiving at a microphone a voice command from a user, wherein the smart furniture controller includes a main body defining a main body interior, and the microphone is disposed within the main body interior, wherein the main body includes an interface for channeling the voice command to the microphone;

relaying the voice command from the microphone to a voice recognition module electrically connected to the microphone;

generating with the voice recognition module a digital signal based on the voice command;

relaying the digital signal from the voice recognition module to a main control unit electrically connected to the voice recognition module;

generating with the main control unit a control signal based on the digital signal;

relaying the control signal from the main control unit to a control output interface electrically connected to the main control unit; and initiating the function of the furniture item via a corresponding function interface of the control output interface wherein the voice recognition module, the main control unit and the control output interface are disposed within the main body interior.

18. The method of claim 17, wherein channeling the voice command to the microphone includes channeling the voice command through an interface conduit extending, within the main body interior, between the interface and the microphone.

19. The method of claim 17, wherein the function of the furniture item is at least one of an actuator function, a light control function, a heating pad function, a massage function, an audio function, a cup holder function, a charging function, and a furniture function.

20. The method of claim 17, wherein relaying the control signal from the main control unit to the control output interface includes relaying the control signal from the main control unit to an auxiliary control unit electrically connected to each of, and between, the main control unit and the control output interface, and relaying the control signal from the auxiliary control unit to the control output interface.

* * * * *